US008548836B2

(12) United States Patent
Draper et al.

(10) Patent No.: US 8,548,836 B2
(45) Date of Patent: *Oct. 1, 2013

(54) BUSINESS DRIVEN LEARNING SOLUTION PARTICULARLY SUITABLE FOR SALES-ORIENTED ORGANIZATIONS

(75) Inventors: William Christopher Draper, New York, NY (US); John R. Hubbell, Evanston, IL (US); Thomas Kenneth Stovall, Marietta, GA (US); Renata Marek, Denville, NJ (US); Brian Leighton Koldyke, Highlands Ranch, CO (US)

(73) Assignee: Accenture Global Services Limited, Dublin (IE)

( * ) Notice: Subject to any disclaimer, the term of this patent is extended or adjusted under 35 U.S.C. 154(b) by 78 days.

This patent is subject to a terminal disclaimer.

(21) Appl. No.: 13/175,135

(22) Filed: Jul. 1, 2011

(65) Prior Publication Data

US 2011/0264481 A1    Oct. 27, 2011

Related U.S. Application Data

(63) Continuation of application No. 12/714,025, filed on Feb. 26, 2010, now Pat. No. 7,974,864, which is a continuation of application No. 10/317,213, filed on Dec. 12, 2002, now Pat. No. 7,702,531.

(60) Provisional application No. 60/391,932, filed on Jun. 28, 2002, provisional application No. 60/391,929, filed on Jun. 28, 2002, provisional application No. 60/398,590, filed on Jul. 26, 2002.

(51) Int. Cl.
G06Q 10/00 (2012.01)

(52) U.S. Cl.
USPC .......................................... 705/7.11

(58) Field of Classification Search
USPC ...................................... 705/7.11
See application file for complete search history.

(56) References Cited

U.S. PATENT DOCUMENTS 4,764,120 A    8/1988  Griffin et al.
5,261,823 A    11/1993 Kurokawa
(Continued)

FOREIGN PATENT DOCUMENTS

WO    WO 9803953 A2    1/1998

OTHER PUBLICATIONS

"CompUSA Inks with CCS For Training" Mar. 22, 1999, TWICE, vol. 14, Issue 7.

(Continued)

*Primary Examiner* — Romain Jeanty
*Assistant Examiner* — Nadja Chong Cruz
(74) *Attorney, Agent, or Firm* — Finnegan, Henderson, Farabow, Garrett & Dunner, LLP

(57) ABSTRACT

Disclosed is a business driven learning solution and related methods for managing the learning and training needs of a sales-oriented organization in a manner that is in responsive to dynamic business needs. The invention employs modules of interrelated and interdependent business processes for the identification and prioritization of learning needs, the selection of learning approaches, the development of learning content, the coordination and delivery of learning instruction, and the overall management and administration learning efforts. Embodiments of the inventions disclosed include sales training objects to provide a template for sales training that is focused on a solution, and how to position and sell the solution, rather than on the products that make up the solution. As a result, the sales force is educated, understands the customers' business requirements, and is able to craft specific value propositions to a given customer with respect to that solution. Thus, the training is customer-centric as opposed to product-centric.

20 Claims, 7 Drawing Sheets

(56) References Cited

U.S. PATENT DOCUMENTS

| | | | |
|---|---|---|---|
| 5,303,042 A | 4/1994 | Lewis et al. | |
| 5,625,818 A | 4/1997 | Zarmer et al. | |
| 5,851,117 A | 12/1998 | Alsheimer et al. | |
| 5,980,429 A * | 11/1999 | Nashner | 482/8 |
| 5,987,443 A | 11/1999 | Nichols et al. | |
| 6,067,525 A * | 5/2000 | Johnson et al. | 705/7.13 |
| 6,067,537 A | 5/2000 | O'Connor et al. | |
| 6,099,320 A | 8/2000 | Papadopoulos | |
| 6,149,438 A | 11/2000 | Richard et al. | |
| 6,149,441 A | 11/2000 | Pellegrino et al. | |
| 6,157,808 A | 12/2000 | Hollingsworth | |
| 6,301,462 B1 | 10/2001 | Freeman et al. | |
| 6,315,572 B1 | 11/2001 | Owens et al. | |
| 6,324,282 B1 | 11/2001 | McIlwaine et al. | |
| 6,347,333 B2 | 2/2002 | Eisendrath et al. | |
| 6,409,514 B1 | 6/2002 | Bull | |
| 6,551,107 B1 | 4/2003 | Buckley et al. | |
| 6,608,992 B2 | 8/2003 | Crook et al. | |
| 6,652,287 B1 | 11/2003 | Strub et al. | |
| 6,658,427 B2 | 12/2003 | Kogut-O'Connell et al. | |
| 6,755,659 B2 | 6/2004 | LoSasso et al. | |
| 6,793,498 B1 | 9/2004 | Nunes | |
| 6,808,992 B1 * | 10/2004 | Ko et al. | 438/283 |
| 6,827,578 B2 | 12/2004 | Krebs et al. | |
| 6,892,049 B2 | 5/2005 | Phalp et al. | |
| 6,898,411 B2 | 5/2005 | Ziv-el et al. | |
| 6,944,624 B2 | 9/2005 | Orton et al. | |
| 6,978,115 B2 | 12/2005 | Whitehurst et al. | |
| 6,988,138 B1 | 1/2006 | Alcorn et al. | |
| 7,031,651 B2 | 4/2006 | McCormick et al. | |
| 7,156,665 B1 | 1/2007 | O'Connor et al. | |
| 7,181,413 B2 | 2/2007 | Hadden et al. | |
| 7,207,009 B1 | 4/2007 | Aamodt et al. | |
| 7,269,569 B2 * | 9/2007 | Spira et al. | 705/7.36 |
| 7,546,246 B1 | 6/2009 | Stamm et al. | |
| 2001/0031451 A1 | 10/2001 | Sander et al. | |
| 2001/0055749 A1 | 12/2001 | Siefert | |
| 2002/0010563 A1 | 1/2002 | Ratteree et al. | |
| 2002/0049750 A1 * | 4/2002 | Venkatram | 707/3 |
| 2002/0061506 A1 | 5/2002 | Catten et al. | |
| 2002/0064766 A1 | 5/2002 | Cozens et al. | |
| 2002/0077884 A1 | 6/2002 | Sketch | |
| 2002/0082833 A1 | 6/2002 | Marasek et al. | |
| 2002/0082883 A1 * | 6/2002 | Hankinson | 705/7 |
| 2002/0095325 A1 | 7/2002 | Chiles | |
| 2002/0103882 A1 | 8/2002 | Johnston et al. | |
| 2002/0142278 A1 | 10/2002 | Whitehurst et al. | |
| 2002/0156702 A1 | 10/2002 | Kane | |
| 2002/0173999 A1 | 11/2002 | Griffor et al. | |
| 2002/0178181 A1 | 11/2002 | Subramanyan et al. | |
| 2002/0188583 A1 | 12/2002 | Rukavina et al. | |
| 2002/0194195 A1 | 12/2002 | Fenton et al. | |
| 2003/0004766 A1 | 1/2003 | Sandoval et al. | |
| 2003/0009742 A1 | 1/2003 | Bass et al. | |
| 2003/0023641 A1 | 1/2003 | Gorman et al. | |
| 2003/0046125 A1 | 3/2003 | Flores | |
| 2003/0050814 A1 | 3/2003 | Stoneking et al. | |
| 2003/0101066 A1 | 5/2003 | Jeanblanc et al. | |
| 2003/0110067 A1 * | 6/2003 | Miller et al. | 705/8 |
| 2003/0229529 A1 | 12/2003 | Mui et al. | |
| 2004/0009462 A1 | 1/2004 | McElwrath | |
| 2004/0162901 A1 | 8/2004 | Mangipudi et al. | |
| 2005/0192954 A1 | 9/2005 | Gupta et al. | |
| 2007/0026374 A1 | 2/2007 | Sanregret et al. | |
| 2007/0061183 A1 | 3/2007 | Seetharaman et al. | |

OTHER PUBLICATIONS

"Getting Better Results," UNT Libraries. Archived Jan. 7, 2002, retrieved from http://govinfo.library.unt.edu/npr/library/book/Better-Results.htm.

Berger "On-the-Job Training," Sales and Marketing Management 150(2):122-125 (1998).

Berry "The E-Learning Factor," Nov. 6, 2000, InternetWeek, retrieved from http://www.internetweek.com/indepth/indepth110600.htm.

Carlson et al., "www interactive learning environment for computer science education," 1996, ACM Press, ISBN:0-89791-757-X, pp. 290-294.

Dobbs "Training on the Fly," Sales and Marketing Management 152(11):93-98 (2000).

Doyle et al. "Calling All Trainers," Training and Development pp. 58-67 (Jan. 1998).

Getting Results Through Learning, OPM.gov, archived from Jun. 1, 2001, available at http://govinfo.library.unt.edu/npr/library/book/contents.htm.

Henry "E-learning technology content and services," Education & Training, 43(4):249-255 (2001).

Holland, "Professional Development in Technology: Catalyst for School Reform," Journal of Technology and Teacher Education, 9(2):245-267 (2001).

Kahn "21st Century Training," Sales and Marketing Management 149(6):81-88 (1997).

Lejfer "The Importance of Training in Sales Force Automation," Supervision 58(12):9-11 (1997).

Lewis et al. "Four Steps to Building E-Learning Success," Workforce 81(5):42, 44, and 46 (2002).

Lin et al. "Fast Learning: Aligning Learning and Development with Business Strategies," Employment Relations Today, 28(3):43-57 (2001).

Long "Make Sales Training Web-Easy," Industrial Distribution 90(10):76 (2001).

MacKnight, Electronic Learning Materials: The Crisis Continues, Apr. 1998, ACM Press, vol. 26, Issue 2, pp. 8-16.

Mateik "The summer institute for instructional technology: goodbye chalk and slate; hello mouse and web," 1995, Wining the Network Game, ACM Press, ISBN:0-89791-704-9, pp. 201-205.

McMaster "Training Places," Sales and Marketing Management 153(10):43-49 (2001).

Notice of Allowance issued in U.S. Appl. No. 10/317,213; Date Mailed: Dec. 15, 2009.

Office Action issued in U.S. Appl. No. 10/265,156; Date Mailed: Oct. 28, 2009.

Office Action issued in U.S. Appl. No. 10/265,156; Date Mailed: May 27, 2009.

Office Action issued in U.S. Appl. No. 10/265,156; Date Mailed: Dec. 26, 2008.

Office Action issued in U.S. Appl. No. 10/265,156; Date Mailed: Jul. 25, 2008.

Office Action issued in U.S. Appl. No. 10/265,156; Date Mailed: Nov. 2, 2007.

Office Action issued in U.S. Appl. No. 10/317,213; Date Mailed: Jun. 24, 2009.

Office Action issued in U.S. Appl. No. 10/317,213; Date Mailed: Nov. 12, 2008.

Office Action issued in U.S. Appl. No. 10/317,213; Date Mailed: Jul. 10, 2008.

Office Action issued in U.S. Appl. No. 10/317,213; Date Mailed: Nov. 26, 2007.

Office Action issued in U.S. Appl. No. 10/317,213, Examiner Interview Summary; Date Mailed: Mar. 12, 2009.

Office Action issued in U.S. Appl. No. 10/317,213, Examiner Interview Summary; Date Mailed: Nov. 12, 2009.

Office Action issued in U.S. Appl. No. 11/882,556; Date Mailed: Nov. 26, 2010.

Office Action issued in U.S. Appl. No. 10/265,156—Examiner's Answer before the Board of Patent Appeals and Interferences; Date Mailed: May 10, 2010.

Pease "Personal Field Sales Training Via the Internet," Agency Sales vol. 30, Issue 2, 3 pgs. (2000).

Pinkham "Tomorrow's Sales People are Today's Trainees," Metal Center News 37(8):62-68 (1997).

Pope "Form a Successful Strategy: Align your e-learning plans with corporate objectives," LTI Magazine Feb. 1, 2002 4 pages.

Rasmusson "Training Goes Virtual," Sales and Marketing Management 152(9):108 (2000).

Restriction Requirement issued in U.S. Appl. No. 10/317,213; Date Mailed: Aug. 10, 2007.

Restriction Requirement issued in U.S. Appl. No. 10/265,156; Date Mailed: Jul. 23, 2007.
Tambini "Aligning Learning Activities and Assessment Strategies in the ESL Classroom," The Internet TESL Journal, vol. 5, Issue 9, Sep. 1999, 5 pgs.
Teare et al. "Building and Sustaining a Learning Organization," The Learning Organization 5(1):47-60 (1998).
Request for Examination in Canadian Patent Application No. 2,433,890; Date Mailed: Mar. 11, 2008.
Request for Examination in Canadian Patent Application No. 2,433,671; Date Mailed: Mar. 11, 2008.
Summons To Attend Oral Proceedings with Communication in EP Application No. 03077001.0; Date Mailed: Feb. 1, 2006.
Summons To Attend Oral Proceedings with Communication in EP Application No. 03077000.2; Date Mailed: Feb. 1, 2006.
Communication in EP Application No. 03077001.0; Date Mailed: Aug. 9, 2004.
Communication in EP Application No. 03077000.2; Date Mailed: Aug. 9, 2004.
Communication in EP Application No. 08013959.5; Date Mailed: Sep. 24, 2009.
Communication and European Search Report in EP Application No. 08013959.5; Date Mailed: Dec. 11, 2008.
Boards of Appeal of the European Patent Office, Decision of Nov. 27, 2003 in application No. 96115736.9 (Applicant Ricoh Comp., Ltd.).
Kirkpatrick, D.L., Evaluating Training Programs: The Four Levels, Second Edition, Berrett Koehler Publishers, Inc., San Francisco, CA: pp. 1, 3-4 (1998).

* cited by examiner

| Module / Competency | Solutions Overview | Customer Business Needs | The Value Proposition | The Solutions Component | The Competition | Cost Justification Tools & Techniques | ESS |
|---|---|---|---|---|---|---|---|
| Demonstrates understanding of solution | X | | | | | | |
| Identifies customer business needs | | X | | | | | |
| Customizes the value proposition | | | X | | | | |
| Demonstrates understanding of Solution components | | | | X | | | |
| Positions solution relative to competition | | | | | X | | |
| Cost justifies the solution | | | | | | X | |
| Articulates the value proposition | | | | | | | X |

Fig. 5b

BUSINESS DRIVEN LEARNING SOLUTION PARTICULARLY SUITABLE FOR SALES-ORIENTED ORGANIZATIONS

CROSS REFERENCE TO RELATED APPLICATION

The present application is a continuation of application Ser. No. 12/714,025, filed Feb. 26, 2010, to issue Jul. 5, 2011 as U.S. Pat. No. 7,974,864, which is a continuation of application Ser. No. 10/317,213, filed Dec. 12, 2002 and issued Apr. 20, 2010 as U.S. Pat. No. 7,702,531, and claims priority from U.S. Provisional Patent Application Ser. No. 60/391,932, filed Jun. 28, 2002, from U.S. Provisional Patent Application Ser. No. 60/391,929, filed Jun. 28, 2002, and from U.S. Provisional Patent Application Ser. No. 60/398,590, filed Jul. 26, 2002, all of which are incorporated by reference. Furthermore, the present application is related in subject matter to U.S. patent application Ser. No. 10/265,156, filed Oct. 7, 2002, the specification of which is hereby incorporated by reference in its entirety.

FIELD OF THE INVENTION

The invention disclosed relates to a business driven learning solution and related methods for managing the learning and training needs of a sales-oriented organization in a manner that is responsive to dynamic business needs. Among other things, the learning solution disclosed is responsive to an organization's business timelines and goals so as to enable a given organization to manage its learning needs as effectively as it would manage a traditional business. In an implementation of the present invention, the business driven learning solution and related methods may be used for managing the learning and training needs of the sales force of an organization.

BACKGROUND OF THE INVENTION

Employee training and education is becoming increasingly critical to the success of organizations within today's modern global economy. As a minimum requirement to remaining competitive, companies that operate in today's complex industries need employees who remain knowledgeable and current in areas of expertise that serve the companies' ever-evolving strategic objectives. Executives of such companies feel this need for improved learning solutions as it is brought to the forefront of their strategic objectives by various business imperatives of the competitive market.

There are a number of forces driving the need for organizations to improve their training organizations. Organization executives are facing urgent business imperatives that demand changes in their training organizations. For example, one such business imperative felt by the executives of many companies is the need to accelerate their "clock speed" when introducing new or repositioning existing product offerings. A difficulty faced by learning systems in supporting this rapid change in business positioning is that many different individuals in a given company perform many different functions and therefore require different types of training to implement a single change in business position. Sales forces in particular must be effectively trained regarding new product features and value propositions before the best sales results can be obtained. Similarly, new positioning of existing products (e.g., pitching groups of products together as providing improved solutions to clients) requires sales forces to understand not just products individually, but their interplay in forming solutions for target clients in order to effectively implement this strategic business objective. The longer such training takes, the more the implementation of strategic business objectives is delayed.

Likewise, learning capabilities of a company must be able to support organization growth and expansion. Leaders of companies may be forced to forgo undertaking bold yet lucrative business growth plans, because bold growth plans require that the company has the ability to rapidly attract, train, and/or deploy a skilled workforce. Thus, improved learning capabilities are needed that accelerate the training speed and speed to competency of an entire workforce.

Similarly, company executives may have a business imperative requiring the initiation of a culture change within the company that will enable a pre-existing workforce to more easily adapt to the company's changing business focus. Learning solutions must therefore also serve as a tool to drive culture change within an organization as an executive's desire to drive a new corporate mindset often has a strong learning component. Common culture change themes that require significant learning efforts include quality control changes, initiatives to increase shareholder value, and steps for adopting a customer-centric business focus.

Furthermore, corporate mergers and reorganizations are commonplace occurrences in many of today's markets and industries. Such mergers and reorganizations often necessitate massive post-merger/reorganization integration efforts by the remaining companies. This not only requires reconciling pre-existing business goals and strategies, but also integrating and upgrading educational and training efforts within the remaining corporate entities. Improved learning solutions are therefore needed to deal with such occurrences by being able to easily modify existing training efforts to match the changing business environment.

Finally, the managements of contemporary companies often view their companies' internal training organizations or efforts as bloated cost centers with very little visibility into cost allocation and virtually no accountability when it comes to returning adequate value on learning investments. Since companies are always looking across their organization to identify ways to manage costs, it would be beneficial if learning solutions were able to be used to allocate learning and training costs accurately across different business units and ventures so as to facilitate cost management. It would be further beneficial if such learning solutions could be used to generate strategic cost reductions or even spur or generate profits. With a proper learning solution, it is possible that training can be leveraged outside the organization for revenue growth and cost savings opportunities. Some examples of this include leveraging corporate knowledge in a new way to create a new source of revenue, using training to align value chain partners, or reducing support costs by placing information with the customer.

Increasingly, business organizations are recognizing the need for training organizations that are responsive to the foregoing business imperatives, and that can deliver results that align with business strategies. The learning solutions currently applied in contemporary organizations fail to satisfy these imperatives.

For example, contemporary sales-oriented learning efforts focus on the features and architecture of the product being sold. Product-focused training of sales forces therefore may be inconsistent across product lines, e.g., in terms of objectives and format. This may result in unnecessary and redundant training content, and an ineffectiveness in meeting the business objectives of the organization. This product-focused approach emphasizes the unique or improved product features without incorporating an employer's business goals. Product-focused training is especially detrimental to sales in so-called "high tech," financial, or computer software industries where a product line may consist of numerous components that can be integrated separately or in various combinations to provide customized "solutions" to clients. The selling employee under a product focused approach is not trained to understand the strategic markets, the customers' business requirements, the overall value potential of a given solution, and the market factors driving the need for the solution. By focusing learning efforts only on a particular product or series of products, the selling employee is not equipped to sell complete solutions that meet customers' and employers' overall corporate objectives.

As another example, contemporary organizations often use their human resource departments or other administrative departments to offer instructor-led training courses for employees at a central location. While this approach may appear attractive from a purely financial perspective because it limits personnel and infrastructure costs, this solution becomes less suitable when the employee students are located in various remote areas (thus requiring travel) and/or have independent, conflicting schedules of availability for instruction. Furthermore, recruiting and training qualified instructors requires significant effort and specialized skills from a learning organization's coordinators. Thus, this approach is less suitable as the number of necessary instructors grows (such as where many courses are needed or where the same is course is needed in various languages).

Computers have been increasingly employed to address many of the logistical issues linked with coordinating the delivery of learning content and/or instruction that needs to be taught multiple times, that needs to be taught to large numbers of students who are remotely located, and/or that needs to be taught to a student body that has conflicting schedules of availability. For example, computer-delivered instruction systems are available wherein students can receive instruction via a computer over a network by accessing a central repository of previously prepared electronic learning ("e-learning") content courses and/or materials stored on a remote server. This approach can be used to provide independent, self-paced instruction on a student by student basis whereby each student can log on to the remote server and access desired e-learning instructional content at any time. Unfortunately, the compiling and maintenance of self-paced computer delivered training requires both subject matter and technical expertise and much development effort to approach the level of effectiveness of classroom training with an instructor. Additionally, such computer-delivered instruction systems are unfortunately not ideal for all types of learning needs, such as where group activities, student-to-student interactions, or student-to-instructor interactions are essential for optimum learning.

Computer networks have likewise been used to provide virtual classrooms where a single instructor teaches a large number of remotely located students simultaneously using web conferencing, remote presentation or like technologies. While the virtual classroom approach can reduce personnel, travel and physical infrastructure needs and still retains the flexibility of relatively easy course content updating, it does not allow self-paced instruction for students having independent and conflicting schedules of availability. Students of a virtual classroom still have to "attend" class at a pre-scheduled time as opposed to reviewing computer delivered content whenever they have available time or wish to work on a given course. Furthermore, virtual classroom technologies can require that access for every remote student be made via a highly robust computer network capable of handling high bandwidth communications applications. Many organizations simply will not have the technical infrastructure to be able to utilize virtual classrooms for all of their learning needs.

Another disadvantage of contemporary learning solutions is that they fail to provide the ability for executives to monitor performance of learning solution efforts in achieving their underlying purpose of furthering business strategies. It would be helpful if executives had access to various performance or success metrics that measure the performance of a given learning solution similar in manner to how performance is measured in traditional performance driven areas of their core business. Useful metrics relating to a learning solution could include, for example, output-related metrics that indicate course hours produced or student days delivered, and metrics which attempt to quantify the success training is having in serving its intended purpose. The inability to accurately monitor performance metrics leaves organizations and their learning services with an inability to ensure service quality, allow for accurate resource forecasts, allocate costs and provide a means to measure the learning solution's success helping the organizations meet goals and commitments. This aspect makes it difficult for executives and learning administrators to make certain that ongoing and future learning efforts are continuously aligned with business strategies, priorities and goals.

The identification and prioritization of learning needs, the selection of learning approaches, the development of learning content, the delivery of learning instruction, and the overall management and administration learning efforts and content require learning solutions that are responsive to business strategies, imperatives, and logistical factors. Contemporary learning solutions employed in the business world have failed to integrate the many complicated processes and systems that must be implemented to ensure that a given company's learning efforts meet their learning needs as dictated by prioritized business strategies.

Thus, there remains a need in the art for an improved learning solution and related methods that overcome the above-described and other problems associated with current learning solutions for sales-oriented organizations. Such a solution preferably utilizes a customizable blend of computerized on-line instructional systems and instructor based services that allow for the efficient distribution of course content and materials as well as enhance the system response time to instructor, student, and/or resource concerns and issues. The aforementioned learning solutions and related methods should provide the ability to respond quickly and efficiently to logistical and resource concerns in order to minimize the time to achieve sales force competency.

SUMMARY OF THE INVENTION

In light of the above-described and other deficiencies inherent in contemporary learning solutions, it is an object of the present invention to provide a learning solution and related methods that ensure that a sales oriented organization's instructional content and delivery mechanisms are aligned with the business and learning objectives of that organization. Such learning solutions and related methods are capable of dramatically improving an organization's efficiency by identifying, prioritizing, developing and delivering employee training efforts and by providing dynamic system monitoring capabilities that ensure the effectiveness of the critical employee training efforts.

Concurrently, it is an object of the present invention to provide a learning solution and related methods that are driven by sales strategies and business priorities in all aspects of learning. Such aspects of learning include the identification and prioritization of learning needs, the selection of learning approaches, the development of learning content, the coordination and delivery of learning instruction, and the overall management and administration of learning efforts.

Further, it is an object of the present invention to provide a learning solution and related methods that adapt the delivery of desired instruction to the most suitable mechanisms, including instructor led training, virtual classroom training, computer delivered instruction, printed reading materials, and appropriate combinations thereof.

Additionally, it is also an object of the present invention to provide a learning solution that allocates learning costs and bills appropriate business units or projects for learning effort expenditures such that the solution can be implemented by a business partner or sub-unit organization operating independently like a separate business entity from the organization requesting/needing the learning services. In this manner, learning services needs of an organization can either be outsourced to a separate business entity or still managed internally as an independent business unit with the same built-in imperatives to reduce costs and drive profit centers as those business units and/or external organizations that will ultimately pay for the learning services.

Furthermore, it is an object of the present invention to provide a learning solution and related methods that are embodied in a network of learning systems which facilitate the monitoring, organization, and reporting of learning solution performance metrics that enable efficient coordination of learning efforts with business strategies and priorities.

Additionally, it is an object of the present invention to provide a learning solution and related methods that offer standardized sales training modules implemented flexibly across an organization's product lines, resulting in a standardized training format that consistently meets the organization's business objectives.

Finally, it is an object of the present invention to provide a learning solution and related methods that enable a sales force to identify the needs and goals of customers and to provide customers with a solutions-based sales approach that reaches across traditional product delineations.

To achieve these and other objects, the disclosed learning solutions and related methods according to the present invention manage the learning and training needs of a sales-oriented organization in a manner that is highly responsive to dynamic business needs. Among other things, the learning solutions and related methods disclosed are responsive to an organization's business timelines, sales strategies, goals and strategic objectives so as to enable the organization to have its learning needs managed effectively in a manner similar to the management of a traditional client services business.

Learning solutions according to embodiments of the present invention comprise four basic modules of interrelated and interdependent business processes for the identification and prioritization of learning needs, the selection of learning approaches, the development of learning content, the coordination and delivery of learning instruction, and the overall management and administration learning efforts. The interaction of the various modules of business processes with one another helps to define the services, performance metrics and application capabilities, among other things, required to support an optimized outsourced solution to meet a given organization's business learning objectives.

One of the four basic modules of the learning solution comprises a business strategy alignment module to accept business strategy input from the learner organization, prioritize learning requests/needs and assist in developing and delivering appropriate learning efforts by communicating relevant information to processes in the various other modules of the learning solution.

Learning solutions according to the present invention also include a content management module that manages the processes for learning content that is developed internally, or alternatively licensed from external sources, and that is necessary to implement the learning efforts identified and prioritized by the business strategy alignment module in light of logistical concerns. Content management modules according to embodiments of the invention can also tag and catalog learning content, such as in the form of a database of reusable knowledge objects, appropriately such that it can be reused in future learning efforts as appropriate and also that it may be easily accessed for delivery to the learner as required.

Learning solutions according to embodiments of the present invention also comprise a delivery module that implements the business processes used in the learning solutions for coordinating the delivery of high quality training across a plurality of media in a cost efficient manner. Learning efforts provided by the learning solutions according to the present invention in response to learning requests are therefore able to utilize combinations of instructor led training ("ILT"), virtual classroom training (such as with a live instructor connected to students through videoconferencing or over a computer network like the Internet), printed instructional materials and interactive computer software-based training mechanisms. Further, the delivery module coordinates the processes of allocating and scheduling of the use of facilities where training takes place and other resources with appropriate instructor and learner commitments.

Additionally, learning solutions according to embodiments of the present invention comprise a learning administration module that facilitates centralized learning management and administrative services across the entire learning solution. Such learning administration modules enable, among other things, the solution to provide registrar functions including tracking the training records of students and the availability of course offerings. Specific learning administration processes can include curriculum management, course registration, course fulfillment support, and record keeping of training results.

Preferred embodiments of the learning solution also include a learning business management module. This module impacts and interacts with the previously discussed modules that make up the learning solution. The learning business module establishes goals for effectiveness and efficiency of the learning solution and monitors quantitative and qualitative measures of success.

In an implementation of the present invention, the business driven learning solution and related methods may be used for managing the learning and training needs of the sales force of an organization. According to the present invention, necessary standardized sales training objects are identified by the business strategy alignment module, which are then developed and implemented flexibly across all product lines via the remaining modules of the invention. The result is a standardized training format that consistently meets the organization's business objectives.

Specifically, in developing sales training objects within the content management module, it is advantageous to focus on the organization's business strategy, e.g., the target customers, competition, customer needs, etc., rather than focusing on the details of the specific product being sold. Examples of sales training objects may include a solutions overview object, a customer business needs object, a value proposition object, a solutions components object, a competition object, a cost justification tools and techniques object, and an executive selling and solutions object. The sales training objects serve to provide a template for sales training that is focused on a solution, and how to position and sell the solution, rather than on the products that make up the solution. While the other sales training objects are individually tailored to each new product, the executive selling and solutions object includes a series of one-time courses that provide generally applicable sales training and complement the other sales training objects. As a result, the sales force is educated, understands the customers' business requirements, and is able to craft specific value propositions to a given customer with respect to that solution. These value propositions are customized based on a particular customer's circumstances, what is important to the customer, and what the sales personnel have gathered as far as the customer's needs. Thus, the training is customer-centric as opposed to product-centric.

Once the training content is developed, in the form of multiple objects, it serves as a reusable template, which may be catalogued via the content management module used over again for different types of products. This reusable template ensures that there is a consistent set of objectives, which are adhered to for any given product or solution as it rolls out in the training. Delivery methods for the training content are managed via the invention's delivery module and may include self-paced web, interactive web, and a blending of e-learning and live instructor-lead classroom training. The use of skilled instructors enables the sales force to receive specific feedback and participate in discussions focused on their customer's business needs and the value proposition of the training solution.

In preferred embodiments of the present invention the learning solution is implemented by an independent business entity that is acting according to a service level agreement with an organization in need of learning services outsourcing. A service level agreement is a contract between the learning solution services provider and the licensing (i.e., outsourcing) organization that establishes the requisite quality and effectiveness levels of the learning solution services as measured by one or more pre-selected performance metrics. Suitable metrics can relate to measurements of the output of a learning solution (e.g., instructional course-hours developed or delivered), measurements of performance level of learning efforts provided by the learning solution (e.g., student satisfaction, test and/or certification results), and measurements of the business impact of learning efforts (e.g., improvements in employee productivity, such as an increase in sales following training). The terms of a service level agreement may require (as compared with the levels measured before the implementation of a given learning effort), for example, minimum learning-output metrics values relating to increases in student enrollment and course hours, minimum learning-performance metrics relating to employee certifications, and minimum learning-impact metric increases regarding gross sales generated by each trained salesperson. Such an outsourced learning solution tracks and reports pre-selected performance metrics to the outsourcing organization on a continuous basis to facilitate cost allocation among appropriate business units or to specific learning efforts (equivalently, "training efforts"), and uses them according to business management processes within the learning solution to gauge the level of effectiveness of particular learning efforts in helping the organization reach desired business objectives and thus refine future learning efforts.

The invention having been thus described, preferred embodiments thereof will now be described in detail with reference to the following figure.

BRIEF DESCRIPTION OF THE DRAWINGS

FIG. 5b is a chart depicting how training objectives are aligned and standardized in an embodiment of the present invention.

DETAILED DESCRIPTION OF THE PREFERRED EMBODIMENTS

As used hereafter, the term "organization" is used broadly to identify the business entity that is in need of a solution to provide learning services. The learning solutions according to the present invention can either be outsourced by such organizations (whereby the processes of the learning solution are implemented by a third party learning services provider under contract to an organization) or can be implemented internally within the organization (as, for example, an independent business unit within the "outsourcing" organization). In embodiments of the invention wherein a learning services business unit within an organization provides learning services to other business units within the organization, the learning services business unit would still feel the need to satisfy customers as it would be responsible for generating a "profit" by meeting predefined performance metrics set by "client" business units (i.e., the other more traditional business units of the organization) and allocating learning effort charges as expenses to the client business units as appropriate. In this manner, the learning solutions according to the present invention can be said to be "outsourceable" by an organization.

Figure 1:
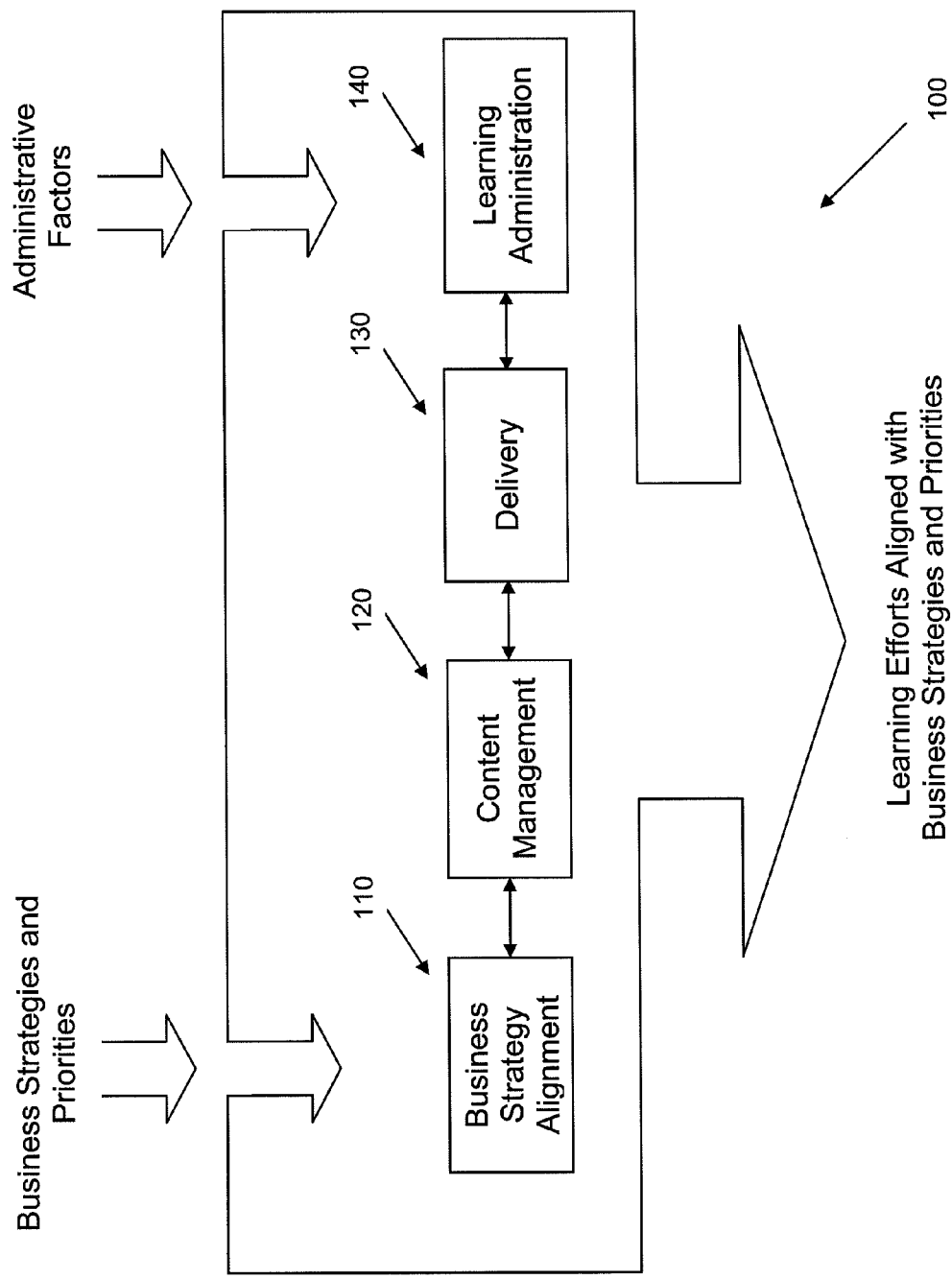
FIG. 1 is a schematic diagram depicting the interaction of the basic modules of a learning solution according to embodiments of the present invention.

A learning solution 100 is conceptually depicted in the schematic diagram of FIG. 1. Solution 100 comprises modules of interrelated and interdependent business processes, along with appropriate tools for efficiently implementing these processes according to the business desires of the organization. The interaction of the various modules of business processes with one another helps to define the services, performance metrics and application capabilities, among other things, required to support an optimized outsourced solution to meet a given organization's business learning objectives.

As depicted in FIG. 1, business strategy alignment module 110 utilizes processes and tools (as described below) to accept business strategies from the organization. It then aligns the organization's learning goals and training efforts with the organization's current strategy, business objectives and organizational structure. The business strategy alignment processes identify the learning objectives of the organization, and assist in developing and delivering a particular curriculum by providing relevant information to processes in the various other modules of solution 100. This alignment ensures that learning curricula is designed to meet the organization's most current needs.

Once solution 100 identifies what types of learning or curriculum are desired and/or required by the organization, the solution is also able to deliver suitable learning materials to fill those needs. Content management module 120 includes processes and associated tools required to build and/or buy appropriate learning content based upon learning objectives and delivery requirements. As will be readily appreciated by one of ordinary skill in the art, it will not always be the best approach for the learning solution 100 to internally develop deliverable learning content in response to a learning effort requested by the organization. On one hand, time constraints, subject matter constraints, and other logistical issues may make it more cost effective for the learning solution to purchase or license previously developed learning content as opposed to developing or compiling new content. Alternatively, the specialized needs of the organization may make it difficult to utilize outsourced or precompiled content. Content management module 120 facilitates solution 100 taking factors such as these appropriately into consideration when assembling suitable learning content.

Once learning content has either been obtained from a third party or developed internally, business processes and associated tools of content management module 120 create, manage and operate a central repository of learning content and knowledge objects. Content management business processes contained in module 120 tag and catalog learning content and knowledge objects appropriately such that they can be reused as appropriate and may be easily accessed for delivery to the learner when necessary.

Delivery module 130 in turn contains business processes and related tools for providing the delivery of high quality training across a plurality of media in a cost efficient manner. Suitable mechanisms and media by which learning content may be delivered to students according to embodiments of the present invention can include combinations of computer-delivered or web-based courses available over electronic networks (such as the Internet) for self-paced instruction, interactive virtual classroom instruction and related media (both video and animation) available over electronic networks which utilize instructors to lead classrooms of remotely located students, in person instructor-led training, and paper-based products used in conjunction with by self-paced or instructor training. Further, the delivery business processes in module 130 manage coordinating the scheduling of the facilities where training takes place with appropriate instructor and learner commitments.

Learning Administration module 140 contains business processes and associated tools necessary to provide learning management and administrative services across the entire business driven learning solution 100. Exemplary learning administration business processes include individual curriculum management, course registration, record keeping of training results, and related financial settlement information (such as where metrics are used by the organization to gauge the performance of the solution 100).

Learning solution 100 also may include a learning business management module and an operations module. The learning business management module presents the capability to manage the overall lifecycle of a learning initiative and to provide continuous improvement to currently ongoing and future learning initiatives. The operations module interacts with all other modules of solution 100 to provide service control, service integration and continuous improvement to existing business processes.

Figure 2A:
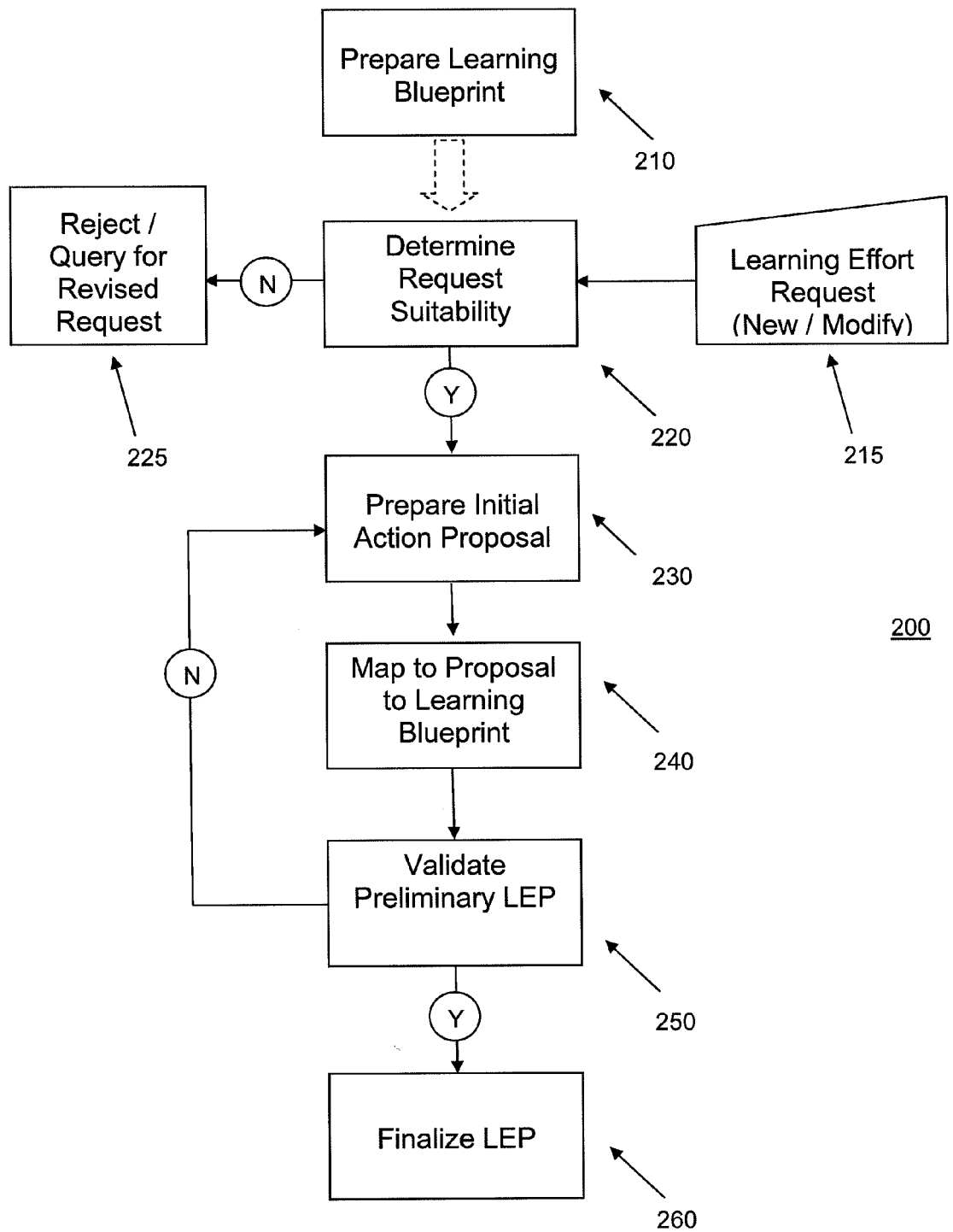
FIG. 2a is a flow diagram depicting a preferred process utilized in embodiments of the present invention to enable alignment of learning efforts with prioritized business strategies.

The processes of the business strategy alignment module 110 are central in ensuring that the learning efforts produced by the learning solution entities are completely aligned with the strategic objectives of the organization. The business strategy alignment module 110 passes the requests from the organization (or business units thereof) for new learning efforts or for modified learning efforts through a formal process whereby the requested learning effort becomes cast in a consistent direction with organizational strategic objectives and priorities, funded from appropriate budget allocations, and transformed into a work in progress by the learning solution 100. Referring now to FIG. 2a, a business strategy alignment process 200 utilized in preferred embodiments of the present invention is depicted and comprises various steps that enable newly requested and ongoing learning efforts to be aligned with prioritized business strategies and goals.

As depicted in FIG. 2a, business strategy alignment process 200 first prepares 210 a customized learning blueprint for the organization. A learning blueprint provides a grouping and organization of various business strategies and goals across the entire organization and identifies potential areas of learning. Each organization's learning blueprint is therefore unique and is used by the business strategy alignment process 200 and therefore module 110 to determine which potential learning efforts (from the many requested by various entities within the organization) introductions or modifications are funded (including from which budget allocation and to what amount) and pursued (i.e., if the requested learning effort consistent with one or more stated learning strategies or objectives reflected in the blueprint) and exactly how the request is fulfilled (i.e., requested learning efforts that map to higher organizational priorities may be entitled to different funding or resources). An organization's learning blueprint is typically reviewed and revised periodically by business strategy alignment module 110 for the organization, such as once or twice a fiscal year to reflect changing business strategies and learning services budgets. Of course, an organization's learning blueprint can be reviewed and revised at any time whenever significant changes in the learning focus and business strategies or priorities of the learner organization occur.

Figure 2B:
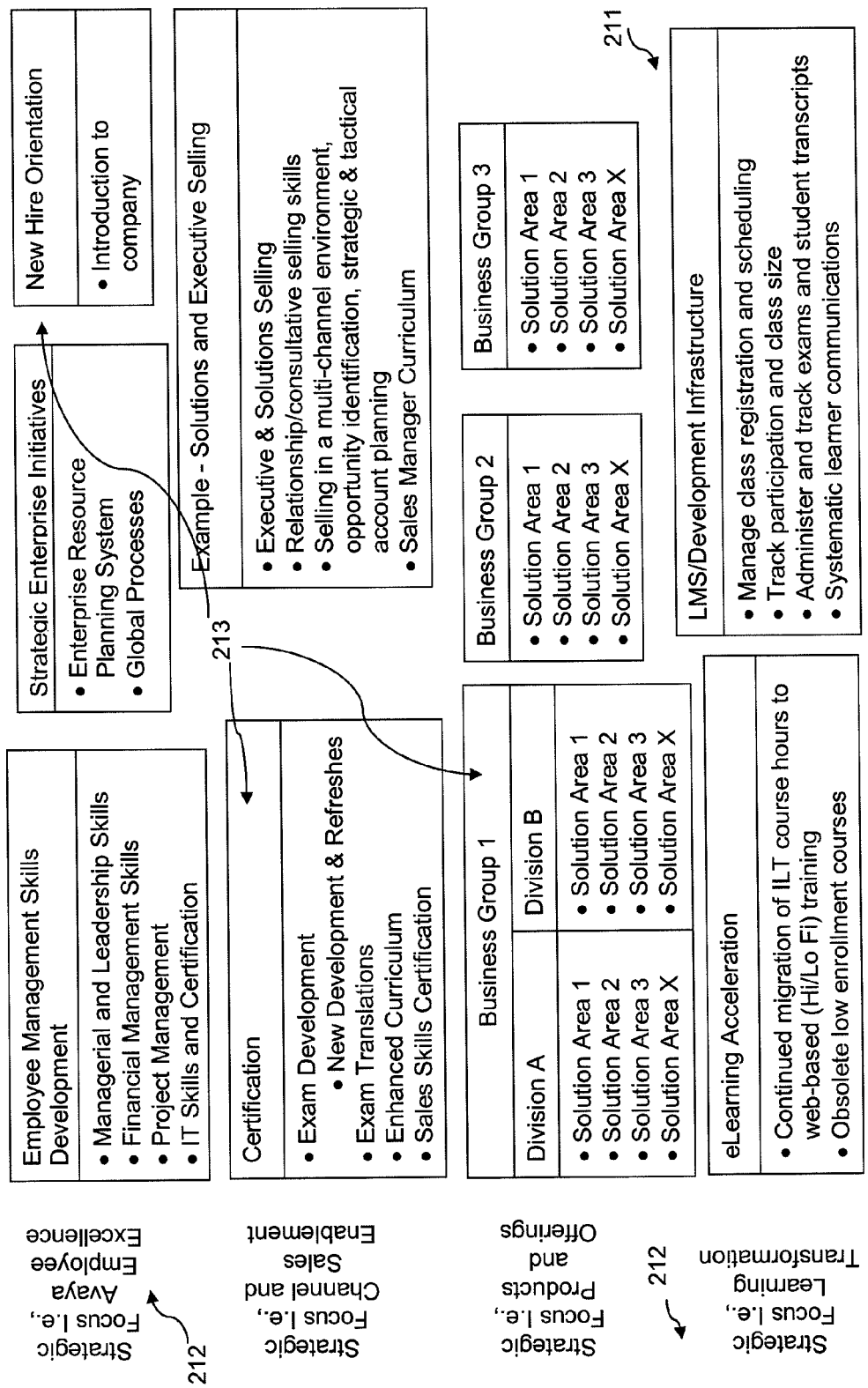
FIG. 2b is a diagram depicting an exemplary learning blueprint that could be utilized in preferred embodiments of the invention to prioritize and fund learning efforts implemented by learning solutions of the invention.

FIG. 2b depicts an exemplary learning blueprint 211 that could be utilized to prioritize and allocate funding to learning efforts implemented by learning solutions of the invention for a particular hypothetical organization that is outsourcing its learning needs. As shown in FIG. 2b, a learning blueprint 211 itemizes different strategic objectives of the organization into various tracts 212 which can represent, for example, organizational areas of focus, product groups, business units, or departments within the organization. For a given organization, as depicted in learning blueprint 211, a tract can be assigned, for example, for product segments, sales skills, general employee development and organization culture transformation. For each such tract, the learning blueprint itemizes initiatives 213 that reflect particular areas in which the organization expects to focus a significant portion of its attention and expenditures on learning efforts. Thus, an employee development tract can contain separate initiatives for new employee orientation, and training regarding an upcoming organization-wide computer system change. Similarly, the product segment tracts can include separate initiatives for major product lines (e.g., custom database solutions) or even individual products of high priority (e.g., new products introducing new product lines). For each tract 212 and/or each initiative 213 itemized within the learning blueprint 211, overall budget caps can be assigned to assist the learning solution in obtaining, managing and delivering learning content that serves the strategies and priorities of the organization.

Referring again to FIG. 2a, the business strategy alignment process 200 initially receives a request 215 for learning services (a "learning effort request") from an individual or business unit of the organization. The learning effort request details what the individual or business unit submitting the request believes is an important learning need that requires a new or modified learning effort. According to embodiments of the invention, a learning effort request can be made in any form, including a verbal communication, a voicemail message, a letter, or an email message directed to a contact for the business strategy alignment module. Preferably, the request is provided on a standardized form (which, even more preferably, can be electronically submitted) that is completed by the requesting entity, and where the form contains queries designed to elicit sufficiently detailed information that allows the business strategy alignment module contact to understand the request sufficiently. After receiving a learning effort request, an initial determination 220 is made regarding whether the request is addressable through training efforts or whether it would alternatively be best addressed through more simple measures like documentation or a newsletter produced by the resources of the requesting business unit of the organization. In the event that the learning effort request is not deemed suitable for the learning solution, at step 225 a rejection is sent to the requester. Alternatively, at 225, a query for a more detailed learning effort request is sent to the requester.

Whenever a learning effort request is deemed to present a learning need that is addressable by the learning solution, process 200 prepares 230 an initial action proposal for the requested learning effort in the form of a preliminary learning effort plan ("preliminary LEP"). The preliminary LEP makes a pre-production judgment as to the type of delivery that will be most advantageous (Web-based course for self-paced instruction, a course involving live or virtual classroom time with an instructor, etc.) given the learning effort request and likely logistical/budget constraints, and whether the request should be addressed by creating wholly new learning content or by modifying the content of an existing learning effort.

At 250, a validation check is made to assess whether the preliminary LEP is feasible given budget priority restraints imposed by the current learning blueprint. If it is not, process 200 returns to step 230 and revises its initial action proposal to produce a modified (e.g., scaled down or re-targeted within the learning blueprint) preliminary LEP. This modified preliminary LEP is then mapped to the learning blueprint (as before, again at step 240) using a revised cost estimate, and the validation check is repeated (at step 250). This process loop repeats itself until the validation check is successful, which indicates that the action proposal fits within business goals and priorities (as evidenced by, among other things, budget allocations associated with the learning blueprint). At this time, a finalized learning effort proposal ("LEP") is prepared 260 for use by the content management module 120. This LEP contains more detailed budget allocation information, delivery timelines, and initial content design requirements for use by the other modules of learning solution 100.

Figure 3:
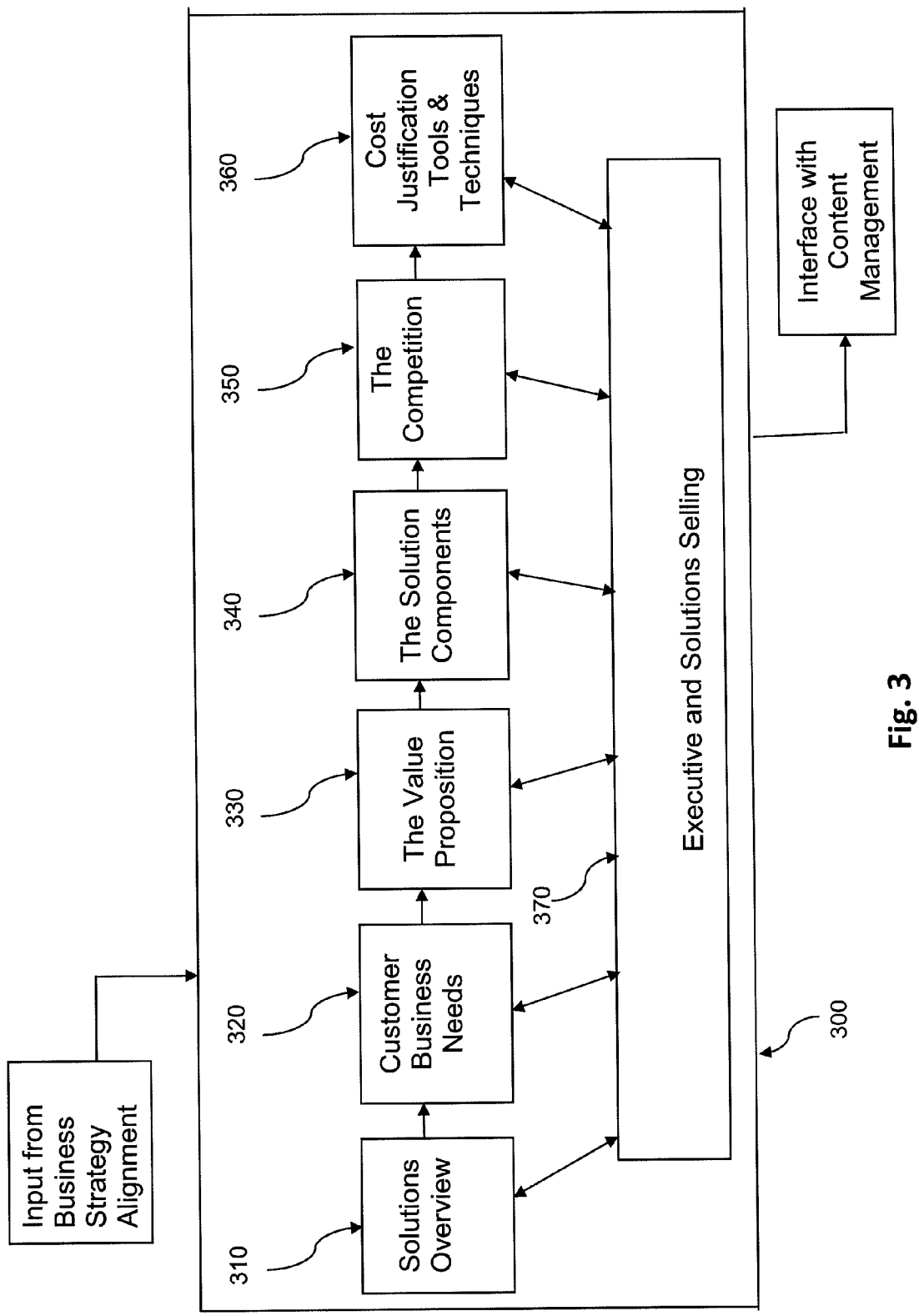
FIG. 3 is a flow diagram depicting the interface between business strategy alignment and content management for a solutions oriented approach to selling products according to embodiments of the present invention.

In preferred embodiments of the invention that are applied to sales-oriented organizations, a business goal or strategy identified by the business strategy alignment module 110 can be particularly adapted to provide solution-based training efforts. This may be the case because the learner organization is in the business of selling products that are inherently designed to be purchased and/or used in various combinations, as, for example, is the case in the software and high technology industries. In such preferred embodiments, the interaction of the business strategy alignment module 110 with the organization has driven the content management module 120 to create and manage learning solutions that are comprised of various learning objects that further a solution oriented sales approach. Such learning objects could include a solutions overview object, a customer business needs object, a value propositions object, a solution components object, a competition object, and a cost justification tools and techniques object. FIG. 3 shows a process 300 that embodies these objects.

In FIG. 3, solutions overview object 310 provides to the learner a synopsis of the business strategy behind each solution. Such an object may include a description of market factors driving the need for the solution. The object 310 may foster understanding of the key strategic markets for both horizontal and vertical industries. This object 310 also could describe how the solution fits into the overall strategy of the selling organization in terms of other technology, product sales, and service contracts. A solutions overview object 310 may also introduce the learner to the high-level business needs that the solution meets and to the value propositions for that solution. Furthermore, the object 310 may address at a high-level how the solution compares to competing products or solutions and give an overview of the particular components that make up the solution.

Following the solutions overview, customer business needs object 320 focuses on techniques that allow a seller to identify with the customer's business perspective. This object 320 may show learners how to match potential solutions to customers' needs. Also the object 320 could explain how to probe managers and executives to determine customer needs. Instruction could present unique approaches for probing different levels of management (e.g., mid-level, senior level, or technology managers) and recognizing the triggers for sales opportunities.

With an appreciation of how to identify the customers' needs from the object 320, a value proposition object 330 then seeks to develop an understanding of the value proposition offered by the solution. This object 330 may present how the value of a solution can be presented effectively to different types of customers (e.g., CEOs, senior management, or technology managers). Also, this object 330 could provide training on how to customize value propositions for given customer scenarios.

With the tools in place to understand customers' needs and the value of a solution, solution components object 340 builds on the introduction provided in the solutions overview object and develops further understanding of the components that make up the solution. This object 340 may describe key features of each solutions component in the context of both customer needs and a competitive comparison. Also, a solution components object 340 may provide the opportunity to practice designing solutions for a given customer scenario. Furthermore, this object 340 could provide instruction on how to ensure compatibility of a designed solution with a customer's current environment.

With a thorough understanding of the organization's solution components, a competition object 350 provides an understanding of comparable competitor offerings, along with the strengths and weaknesses of those competitor offerings. This object 350 could also provide techniques to overcome competitors' claims.

The next object of process 300 in preferred embodiments for sales-oriented organizations is cost justification tools and techniques object 360. This object 360 may include instruction about when cost justification may be required for particular customer scenarios. This object 360 could teach the sales force to identify appropriate cost justification methods. Furthermore, this object 360 may provide the opportunity to practice using cost justification tools and techniques using case studies and examples.

Process 300 may also include one-time course offerings to cover topics of that are of a more general nature, called executive selling and solutions object 370. The subject matter of these one-time offerings can be reinforced throughout the other components of process 300. Topics for these one-time offerings may include, e.g., developing business acumen and techniques for value-based sales proposals. A course offering in developing business acumen may include several components, such as a value selling component, a component on identifying interests/concerns of different management levels, a component to introduce how executives use financial statements, a financial analysis component, a financial research component, and a component on making presentations to executives. Similarly, a course in value-based sales proposals may include components such as crafting value propositions, using industry analysis tools to understand customers' businesses, using financial tools to understand customers' businesses, identifying and articulating a value hypothesis, developing techniques to refine/optimize a value hypothesis, and creating a final value proposition.

Figure 4:
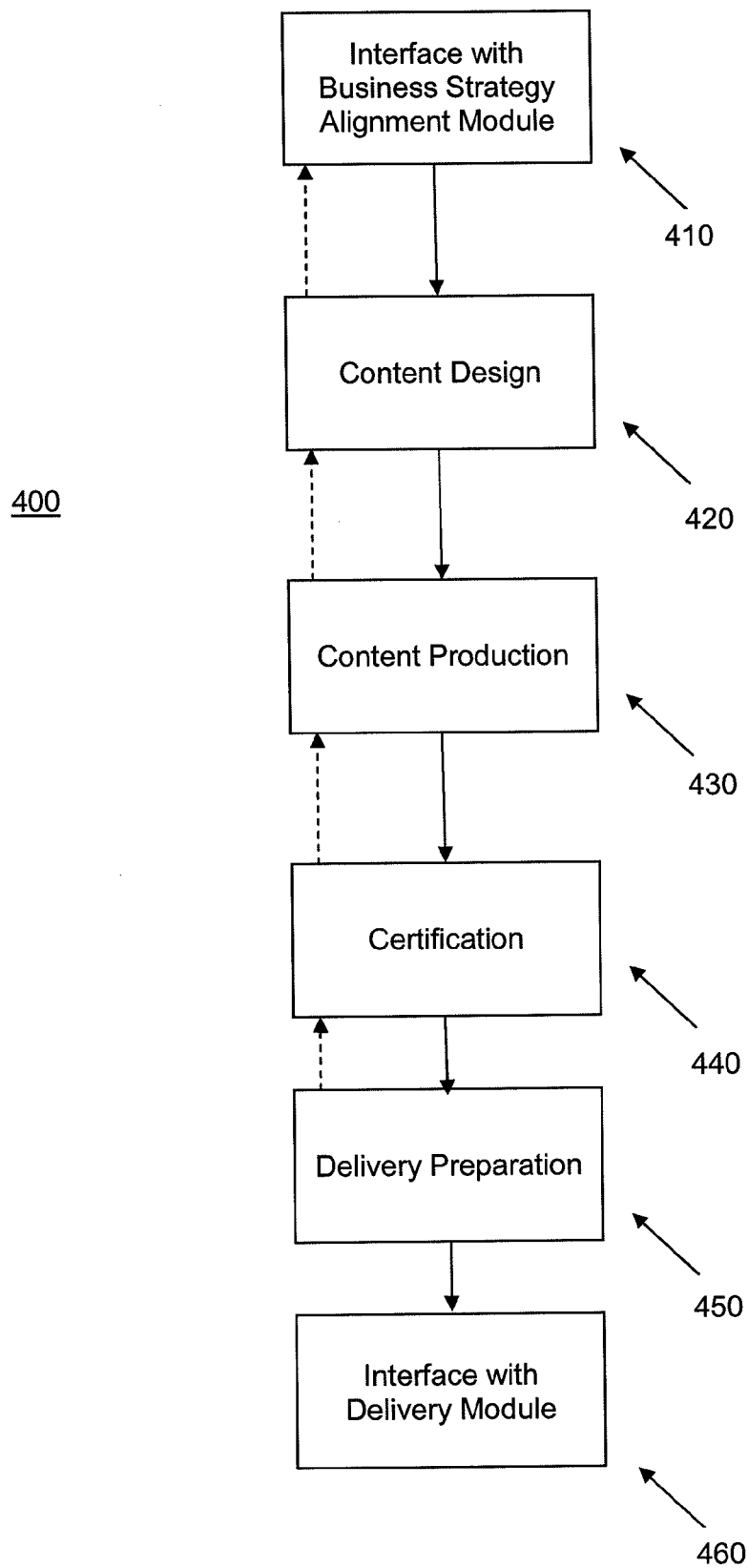
FIG. 4 is a flow diagram depicting an iterative process for developing learning content according to embodiments of the present invention.

A particular process implemented in content management module 120 of a learning solution 100 according to such preferred embodiments is conceptually depicted in the flow diagram of FIG. 4. Specifically, FIG. 4 shows a content development process 400 that embodies a combination iterative steps that enable a learning solution to leverage benefits of the business strategy alignment module processes and thereby identify, develop, and manage deliverable learning content internally for an organization's required learning efforts. Content development process 400 starts by interfacing 410 with business strategy alignment module 110 to receive information regarding the learning content that needs to be developed for a learning effort. This passage of business strategy alignment information helps to ensure that any new or modified learning materials and content are always aligned with the business learning strategies and objectives of a licensing organization. The business strategy alignment information is then passed down (and possibly revised as described below) through the various subsequent steps of content development process 400, including content design 420, content production 430, certification 440, and delivery preparation 450 until it is ultimately handed off with any newly-developed deliverable learning content at step 460 by interfacing with the processes of the delivery module.

In operation, upon receiving the initial content design requirements from the business strategy alignment processes, the content design step 420 leverages technology and organization services to implement a series of functions, tests, and analyses to produce an initial layout of any new content that needs to be developed for a given learning effort. In preferred embodiments for sales-oriented organizations, such new content may include revisions or wholesale changes to the solutions overview object, customer business needs object, value propositions object, solution components object, competition object, and cost justification tools and techniques object discussed above. The functions, tests, and analyses performed during content design 420 include performance strategy and role impact strategy to make an initial assessment regarding a recommended instructional design (i.e., whether to utilize computer delivered self-paced courses, instructor-led training ("ILT"), virtual classrooms, etc.). In making this initial assessment, care is taken to perform audience analyses and environment analyses to ensure that the chosen instruction design is not incompatible with the logistics of the learning audience (e.g., whether it is feasible to expect the learners to be able to attend pre-scheduled live classes with an instructor) or with learning services resources (such as instructor/classroom availability, budget and development schedule constraints). The initial assessment will often also include media layout design (i.e., for a computer-delivered interactive course, this would include a layout of the types of audio, video, and graphical presentations and simulations that would be required or useful in teaching the subject matter) and indications as to whether subject matter experts ("SMEs") would be necessary for consultation.

In the event that additional information is necessary or that the learning content cannot be designed within budget or logistical constraints, feedback can be provided upstream to the business strategy alignment processes to obtain revised initial content design requirements. This feedback is indicated in FIG. 4 by the broken arrow going from step 420 to 410, with the broken nature of the arrows indicating the optional upstream aspect of this flow. All of the information included in the initial design assessment is used to produce a development plan that is sensitive to budget and logistical constraints and delivery timelines detailed by business strategy alignment module 110, with the development plan then being referenced by the later steps of content development process 400.

The results and/or conclusions detailed in the development plan as produced from the various analyses performed during content design 420 are then utilized for downstream content production 430, certification 440, and delivery preparation 450 so as to ensure that the development of a course's deliverable learning content and materials remains consistent with the organization's business learning strategies and objectives and particular learning effort need. During content production 430, technology and organization services are leveraged to develop, license and build suitable learning content for the carefully designed course curricula. This content production 430 can include, for example, subject matter information collection and organization via SMEs, web-based training ("WBT") learning content object development for self-paced learning courses delivered via computer, ILT and virtual ILT ("v-ILT") curriculum layout and scheduling development, multi-media learning content development (including both pre-production and post-production development) for use in one or more courses of various types, packaging and integration with pre-existing learning content, negotiation of any licenses or rights to use purchased content, instructor development and training, and job-aid production.

As with the prior content design step 420, results of the ongoing content production step 430 can be communicated upstream to the content design step 420 to facilitate peer review and enable revisions to current design plans or even further upstream to enable LEP revisions if necessary. Once learning content has been finalized (or, optionally, a trial version capable of being reviewed has been finalized), a certification 240 is performed to review the output of the content production step 230. This certification compares the produced content against the design requirements of the LEP and development plan to ensure that the overall course development, production, and packaging are consistent with the licensing organization's business learning strategies and objectives before the content is certified and released for delivery. Any content that does not match these design requirements is sent back to the content production 430 stage (or earlier stages) for revision as shown by the broken arrows.

After the design 420 and production 430 of course content and materials followed by their certification 440, the certified new or revised content is subjected to a delivery preparation step 450. For computer delivered instruction objects and the like, this delivery preparation step can include formatting or versioning of any content objects to be compliant with industry standards of electronic learning content delivery. Content development process 400 ends by interfacing 460 with the delivery processes of the delivery module 130 for storing the tagged and cataloged content objects to simplify their retrieval and ultimate delivery to learners.

As will be readily appreciated by one of ordinary skill in the art, it will not always be the best approach for the learning solution 100 to internally develop deliverable learning content in response to a learning effort requested by the organization. Often, time constraints, subject matter constraints, and other logistical issues may make it more cost effective for the learning solution to purchase or license previously developed learning content (completely ready for delivery to learners or otherwise) or commission the development of suitable learning content from third party providers. For example, if the organization needed employee training for sales of a new product line developed outside the organization, it may be more efficient to purchase training or reuse training materials from the provider of the new product line as opposed to creating new learning content internally from scratch. Therefore, the content management module 120 according to embodiments of the invention also contains processes that enable the procurement of third party learning content and services as well as integrating that content and services for delivery and administration within the control of the learning solution.

As was the case with internally developed learning content, any learning content purchased or licensed from third party providers would need to meet the detailed budget allocation information, delivery timelines, and initial content design requirements established by business strategy alignment module 110. Also similar to how was described above with respect to the content development process 400, any content obtained from third party sources would be certified, formatted, versioned, tagged and cataloged in roughly the same manner as internally developed learning content. After receiving third party content, the content management module still, like in process 200, certifies the content against requirements established by the business alignment module. Any electronic learning content would then be versioned and/or formatted to be compatible or consistent with internally developed content. Such electronic learning content would then, as part of content management module 120, be tagged appropriately and placed into data stores to facilitate organization, delivery upon demand, and location/reuse of the content for the current and future learning efforts. In this manner, content management module 120 allows the learning solution 100 to take advantage of the most efficient mechanisms for assembling appropriate learning content for efforts needed by the organization.

Figure 5A:
FIG. 5a is a chart depicting redundancy and inconsistencies inherent in a typical contemporary learning solution.

Collectively, the objects of process 300 in preferred embodiments for sales-oriented organizations are used to align training objectives with business goals and sales strategies of the organization while, at the same time, avoiding redundancy. FIG. 5a graphically represents the redundancy and inconsistencies inherent in a typical contemporary learning solution for a sales-oriented organization. The representative product-focused training modules, Sales ILT, ISales iTV, Sales CD-ROM, ISales Overview iTV, Sales Overview Teletraining, and Products and Solutions Web, can address multiple competencies as shown by the "X" marks under each module title. The separate modules, when combined as a learning solution, result in redundant material for some competencies (such as demonstrating an understanding of a solution) and inadequate coverage of other competencies.

FIG. 5b represents a learning solution for a sales-oriented organization structured under the present invention. The solution addresses the same competencies shown in the inefficient learning solution of FIG. 5a. However, the learning solution is aligned according to preferred embodiments of the invention for sales-oriented organizations to optimize training efforts and resources. The representative training modules include the seven objects mentioned in the above discussion of content design process 300: a solutions overview object, a customer business needs object, a value propositions object, a solution components object, a competition object, a cost justification tools and techniques object, and an executive selling and solutions object. The standardized sales training modules shown in FIG. 5b each address a single competency as designated by the "X" marks under each module title. This structure eliminates the redundancy and inconsistencies inherent in typical contemporary learning solutions.

As will be appreciated by those skilled in the art, embodiments of the learning solution of the present invention may be implemented in a network of learning platforms that together provide the electronic tools and information sharing capabilities needed by a learning solution services provider to efficiently implement and manage learning efforts according to the business desires of a complex learner organization. The platforms provide coordination and synchronization of learning content development, delivery and management so as to enhance the learning solution's response time to instructor, student, and/or resource concerns and issues. Preferably, the learning solution networks also track information relating to the learning solution and its learning efforts and provide visibility of that information to facilitate business management processes.

While exemplary embodiments of the invention have been shown and described herein and in the attached appendices, it will be obvious to those skilled in the art such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope by the claims as appended hereto.

What is claimed is:

1. A system for managing business driven learning efforts to meet learning needs of an organization, the system comprising:
    a processor; and
    computer-readable medium encoding instructions for managing business driven learning efforts, the instructions comprising modules of business processes for execution by the processor, including:
        a business strategy alignment module configured to receive a request that identifies a first learning need related to a customer solution, and to prioritize the request in view of learning needs of an organization;

wherein the business strategy alignment module is further configured to select a learning approach to meet the first learning need, and wherein the customer solution comprises a group of products for meeting needs of a customer of the organization, and a content management module configured to design, procure, and manage a first learning effort comprising information relating to an interplay of the products associated with the customer solution, wherein the first learning effort is based on the selected learning approach;

a delivery module configured to coordinate delivery of the first learning effort to members of the organization across a plurality of training media; and a learning administration module configured to manage and track availability, delivery, and results of the first learning effort in relation to the members.

2. The system according to claim 1, wherein the instructions further comprise a learning business management module configured to assess whether the business driven learning efforts are meeting business goals, strategies and priorities of the organization.

3. The system according to claim 2, wherein the assessment by the learning business management module comprises:

receiving performance metrics regarding the first learning effort from the content management module, the delivery module, and the learning administration module;

comparing the performance metrics against predetermined minimum service levels; and revising operations of the business strategy alignment module, the content management module, or the delivery module in an effort to have the performance metrics meet the predetermined minimum service levels.

4. The system according to claim 1, further comprising estimating a cost for developing and delivering the first learning effort and comparing the estimated cost to an associated budget allocation.

5. The system according to claim 1, wherein the content management module is further configured to develop learning content related to the information according to budget restraints, initial content design requirements, and delivery timelines from the business strategy alignment module.

6. The system according to claim 5, wherein the content management module includes training mechanisms selected from the group of the following:

a customer solutions overview object for synopsizing a business strategy behind the customer solution, a customer business needs object for showing techniques for determining the business needs of the customer, a customer solution components object for developing understanding of the group of products of the customer solution, and a competition object for developing an understanding of comparable competitor offerings.

7. The system according to claim 6, wherein the customer solution components object is configured to perform at least one of the following:

describing key features of each product in the group of products in a context of the business needs of the customer;

presenting a competitive comparison for each product in the group of products in the context of the business needs of the customer;

allowing practice in designing solutions for selected scenarios for the customer; and instructing on how to ensure compatibility of the customer solution with a current environment of the customer.

8. The system according to claim 1, wherein the content management module is configured to create, manage, and operate a central repository of learning content related to the information and at least one knowledge object associated with the learning content.

9. The system according to claim 8, wherein the content management module is configured to tag and catalog the learning content for reuse in future learning efforts.

10. The system according to claim 1, wherein the appropriate learning approach comprises at least one of the following: a new learning effort, a modified learning effort, and documentation.

11. The system of claim 1, further comprising a knowledge object associated with the information, wherein the knowledge object comprises at least one of the following:

a value propositions object for developing an understanding of a value proposition offered by the customer solution, and a cost justification tools and techniques object for presenting instruction on justifying cost for the customer, including identifying when cost justification may be required for the customer.

12. The system of claim 1, wherein the learning administration module is further configured to provide at least one of the following: registrar processes for tracking training records of a learner or availability of course offerings, curriculum management processes, course registration processes, course fulfillment support processes, and training results record keeping processes.

13. A computer-implemented method for providing learning services to members of an organization, comprising:

sending, by a computer, to an organization a service level commitment detailing minimum service levels of learning efforts to be provided to designated students at the request of the organization;

receiving, by a computer, from the organization a plurality of requests for learning efforts;

prioritizing, by a computer, requests for learning efforts based on business strategies and goals of the organization;

identifying, by a computer, learning effort approaches to meet the requests, wherein the learning effort approaches comprises a group of products for meeting needs of the designated students;

obtaining learning content for the learning effort approaches, wherein the learning content comprises information relating to an interplay of the products associated with the learning effort approaches, wherein the learning content is based on the identified learning approaches; and delivering a learning effort containing the obtained learning content to the designated students, wherein the learning content is delivered in a format, and wherein the delivering meets the minimum service levels of the service level commitment.

14. The method according to claim 13, wherein said identifying of learning effort approaches to meet said requests comprises aligning of said learning services with said business strategies and goals of said organization.

15. The method according to claim 14, wherein said aligning with said business goals and strategies of said organization comprises said learning services provider periodically identifying business goals and strategies of said organization and assigning relative priorities thereto.

16. The method according to claim 15, wherein said business goals and strategies are identified by designating tracts and initiatives representative of areas of instruction needed by said organization.

17. The method according to claim 16, wherein said tracts and initiatives are embodied in a learning blueprint, said blueprint assisting in identifying learning effort approaches to meet said requests.

18. The method according to claim 17, wherein said learning blueprint details said budget allocations for said tracts and initiatives.

19. The method according to claim 17, wherein said learning blueprint is revised as necessary to reflect significant changes in said business goals, strategies, and priorities.

20. The method according to claim 13, wherein said obtained learning content and said delivered learning effort are compared against said minimum service levels by receiving performance metrics regarding operations of said learning solution, comparing said performance metrics against said minimum service levels; and revising actions of said learning services provider in an effort to have said performance metrics meet said minimum service levels.

\* \* \* \* \*

UNITED STATES PATENT AND TRADEMARK OFFICE
CERTIFICATE OF CORRECTION

| | | |
|---|---|---|
| PATENT NO. | : 8,548,836 B2 | Page 1 of 1 |
| APPLICATION NO. | : 13/175135 | |
| DATED | : October 1, 2013 | |
| INVENTOR(S) | : William Christopher Draper, Jr. et al. | |

It is certified that error appears in the above-identified patent and that said Letters Patent is hereby corrected as shown below:

On the Title page, item 57 (abstract), line 3, "manner that is in responsive to" should read --matter that is responsive to--.

Signed and Sealed this

Thirty-first Day of December, 2013

Margaret A. Focarino
*Commissioner for Patents of the United States Patent and Trademark Office*